United States Patent [19]

Iwashita

[11] Patent Number: 4,928,168

[45] Date of Patent: May 22, 1990

[54] BILLING DATA DISPLAY SYSTEM AND TERMINAL USED THEREIN FOR A CLOSED CIRCUIT TELEVISION SYSTEM

[75] Inventor: Kazuhiro Iwashita, Tokyo, Japan

[73] Assignee: Pioneer Electronic Corporation, Tokyo, Japan

[21] Appl. No.: 312,166

[22] Filed: Feb. 21, 1989

[30] Foreign Application Priority Data

Aug. 8, 1988 [JP] Japan .................... 63-196127

[51] Int. Cl.$^5$ .................... H04N 7/10; H04N 9/00
[52] U.S. Cl. .................... 358/84; 358/86; 455/2; 455/5
[58] Field of Search .................... 358/84, 86; 455/2, 4, 455/5

[56] References Cited

U.S. PATENT DOCUMENTS 4,536,791 8/1985 Campbell et al. .................... 358/84 X
4,616,263 10/1986 Eichelberger .................... 358/86

FOREIGN PATENT DOCUMENTS 61-285888 12/1986 Japan .
63-24778 2/1988 Japan .................... 358/86
63-177673 7/1988 Japan .................... 358/86
WO86/01962 3/1986 World Int. Prop. O. .................... 358/84

Primary Examiner—Keith E. George
Attorney, Agent, or Firm—Sughrue, Mion, Zinn, Macpeak & Seas

[57] ABSTRACT

In a closed circuit television system having a central facility connected to a plurality of terminals, it is possible to display billing data showing charges for hotel accommodations, pay television reception, equipment use, etc., at the terminals. The computer in the central facility stores data corresponding to the charges owed by a customer at one of the terminals. When a customer wishes to see his bill, he depresses a button at his terminal. The appropriate charges are retrieved from the computer and displayed at the terminal.

10 Claims, 2 Drawing Sheets

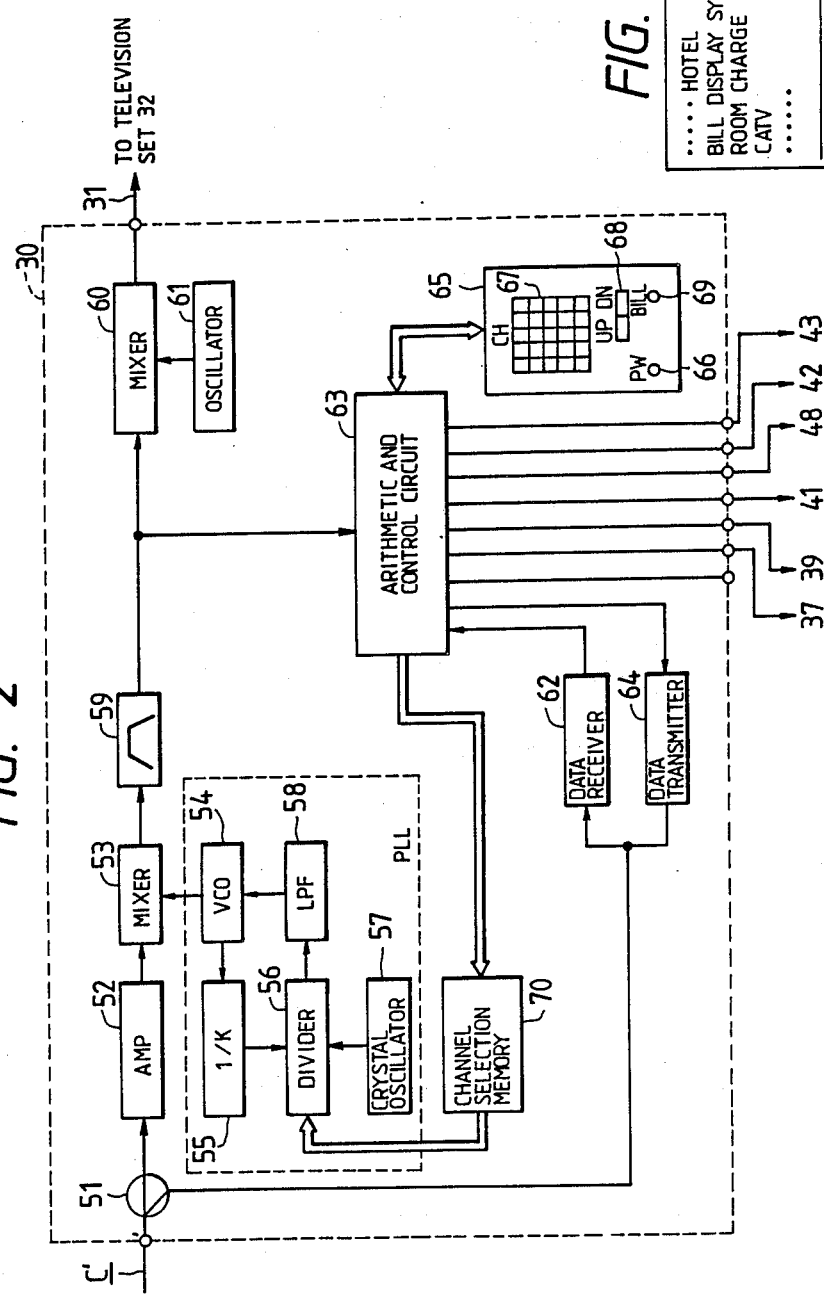

BILLING DATA DISPLAY SYSTEM AND TERMINAL USED THEREIN FOR A CLOSED CIRCUIT TELEVISION SYSTEM

BACKGROUND OF THE INVENTION

The present invention relates to a closed circuit TV system (hereinafter referred to as a "CCTV system") in which the central facility is connected to a number of terminals through cables for transmitting video signals to the terminals. More particularly, the present invention relates to a billing data display system therefor in which a bill for the use of equipment and/or for the reception of pay television programs at the terminals is displayed on the television sets of the terminals.

In general, a CCTV system is utilized by hotels or the like. When pay television programs are received by the terminals installed in rooms of the hotel, the computer in the central facility stores the charges for the reception of the pay television programs according to the periods and lengths of time of reception. When each of the hotel guests checks out of the hotel, the charge for the reception of pay television programs together with the accommodation charges is printed out at the front desk.

In this case, the hotel guest knows his accommodation charges before checking out of the hotel, but he cannot find out the charge for the reception of pay television programs, the charges for the utilization of the refrigerator in the room, for eating and drinking in the hotel restaurant, or for the use of games provided in the room, or any other charges which may be made before he checks out of the hotel.

SUMMARY OF THE INVENTION

Accordingly, an object of the present invention is to provide a billing data display system for a CCTV system in which, when it is necessary for a hotel guest to know what he owes (i.e., his bill), he may display the charges on the television set in his room by merely depressing a request button provided on the terminal.

The foregoing object of the invention has been achieved by the provision of a monetary charge display system for a CCTV system in which, according to the invention, in response to depression of the request button of a terminal, the computer in the central facility determines the monetary charges therefor and causes a character generator to form the corresponding video signal, which is transmitted through a predetermined channel to that terminal.

BRIEF DESCRIPTION OF THE DRAWINGS

FIG. 2 is a block diagram showing an example of a terminal used in the system of the present invention; and FIG. 3 is a diagram showing an example of an image displayed on the television set of a terminal in the system of the present invention.

DESCRIPTION OF THE PREFERRED EMBODIMENT

Figure 1:
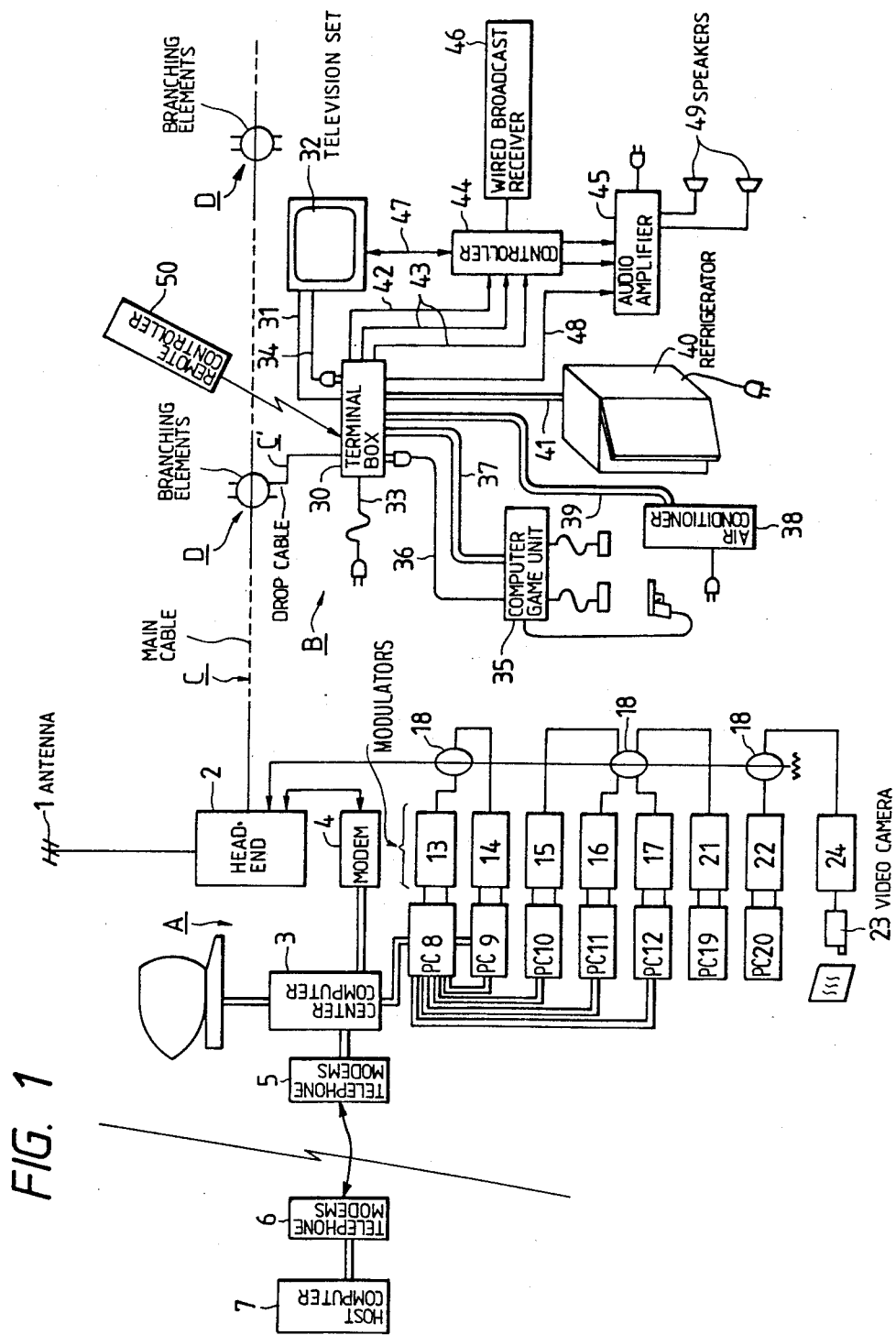
FIG. 1 is a block diagram showing the arrangement of a billing data display system according to the present invention.

An example of a billing display system for a CCTV system according to this invention will be described with reference to FIG. 1.

In the system shown in FIG. 1, a number of terminals B provided, for instance, in rooms of a hotel are connected to a central facility A through a main cable C. More specifically, the main cable C is extended from the central facility A, and has branching elements D, which are connected through drop cables C' to respective terminals B.

The central facility A has a head end 2 which receives a broadcast television signal through an antenna 1 installed outside. In the head end 2, the received signal is subjected to frequency conversion before being transmitted to the terminals. The head end 2 also can transmit video signals obtained from a video tape recorder or video disc player (not shown) to the terminals. The head end 2 is connected to modem 4 for transmitting data between each of the terminals B and a central computer 3.

The central computer 3 is connected through telephone modems 5 and 6 to a host computer 7 which sums up charges for each of the rooms. A plurality of personal computers (five personal computers in FIG. 1) 8 through 12 are connected in parallel to the central computer 3.

The central computer 3, the host computer 7, and the personal computers 8 through 12 operate together to store data such as charges for the reception of pay television programs and charges for the use of rented equipment in each of the rooms, and, when requested, sum up those chages for each terminal and send the summation to the terminal.

Personal computers 8 through 12 are used as character generators for converting billing data into video data. The outputs of personal computers 8 through 12 are applied to modulators 13 through 17, respectively, where they are converted into different RF signals. The RF outputs of the modulators 13 through 17 are applied through mixers 18 to the head end 2, so that they are applied to the cable C together with the broadcast television signal which has been subjected to frequency conversion (hereinafter referred to as "a retransmission television signal", when applicable) and the video signal obtained from a video disc or the like.

The central facility A has two more personal computers 19 and 20, which are used as character generators for forming particular video signals. That is, when a terminal calls the central facility for billing data, the first character generator operates to form a message to display a phrase "Being Computed" on the television set of the terminal. The second character generator is operated when a number of calls for billing data are made by terminals; that is, the second character generator operates to form a message to display "Calls for billing data are jammed on the television sets of the terminals.

The character outputs of the two personal computers 19 and 20 are applied to modulators 21 and 22, respectively, where they are converted into different RF outputs. The RF outputs are supplied through mixers 18 to the head end 2, so as to be applied to the main cable C.

The central facility A further comprises a video camera 23, and a modulator 24 for converting the output of the video camera into an RF signal. The output of the modulator 24 is also applied through the mixers 18 to the head end 2, so as to be applied to the cable C together with the outputs of the modulators 13 through 17, and the outputs of the modulators 21 and 22.

In each room, terminal B fundamentally comprises a terminal box 30 and a television set 32 connected through a cable 31 to the terminal box 30.

The terminal box 30 has a power line 33 which is connected to a commercial electric power source, and an AC outlet to which the power line 34 of the television set 32 is connected. The terminal box 30 also has an AC outlet to which the power line 36 of a computerized game unit 35 is connected, and a cable 37 through which signals are transmitted between terminal box 30 and the computerized game unit 35. Furthermore, signal lines 39 and 41 are connected to the terminal box 30. Signal line 39 is used for the central facility A to control the operation of an air conditioner 38 provided in the room, and signal line 41 is used in determining charges for the use of a refrigerator 40 in the room.

A video signal line 42 and right and left audio signal lines 43 are connected between the terminal box 3 and a controller 44. When a video signal is available, controller 44 applies the television audio signal which comes through the terminal box 30 to an audio amplifier 45. When no video signal is detected, controller 44 applies the audio signal which is output, for example, by a wired broadcast receiver 46. Controller 44 has a cable 47 for supplying a television picture base band signal to the television set 32 when necessary.

A control line 48 for receiving a volume control signal from terminal box 30 is connected to the audio amplifier 45, so that the volume of loudspeakers 49 can be adjusted by operating a volume control button on terminal box 30.

A remote controller 50 is provided for terminal box 30. Almost all of the functions of terminal box 30 can be performed by operating the remote control.

FIG. 2 is a block diagram showing the arrangement of terminal box 30.

A video signal (91.25–450 MHz) transmitted through drop cable C' is supplied through a branching element 51 to an RF amplifier 52, the output of which is applied to a mixer 53. Mixer 53 is connected to a phase-locked loop (PLL) comprising a voltage-controlled oscillator (VCO) 54, a prescaler 55, a programmable divider 56, a crystal oscillator 57, and a low-pass filter (LPF) 58. The PLL forms a first local oscillator. The intermediate frequency output selected by the mixer is supplied through an intermediate frequency filter 59 to a second mixer 60.

The television signal supplied to the second mixer is converted into an RF empty channel with the aid of the output signal of a second local oscillator 61 connected to the second mixer 60, and is sent out through the output cable 31 to the television set 32.

On the other hand, a "down" data signal (which is a data signal transmitted from the central facility to a terminal) provided through cable C' is applied through branching element 51 to a data receiver 62 so that a "down" FSK signal is demodulated and applied to an arithmetic and control circuit 63.

In FIG. 2, reference numeral 64 designates a data transmitter. When a pay television program is received, or when game unit 35 is used, or when food is taken out of refrigerator 40, data transmitter 64 transmits the charge data together with the address code of the terminal on the 44 MHz PSK modulation output.

Reference numeral 65 in FIG. 2 designates an operating keyboard. Keyboard 65 has a power control button (PW) 66 for controlling the power on-off operation of the main section of the terminal, channel select buttons (CH) 67 for selecting a desired television channel, a volume control button 68 for controlling the volume of the loudspeakers, and a billing data request button (BILL) 69 for requesting billing data for the use of the terminal. The data provided by operating these buttons are applied through the arithmetic and control circuit 63 to a channel selection memory 70 or the data transmitter 64.

When the operator selects a desired channel by operating one of the channel select buttons 67 in a terminal B, the arithmetic and control circuit 63 applies the channel selection data to the channel selection memory 70. In response to the channel selection data, the channel selection memory 70 supplies a divider coefficient corresponding to the channel selection data to the programmable divider 56 to activate the first local oscillator, namely, the PLL, so that the desired channel is selected.

The arithmetic and control circuit 63 supplies the selected channel data to the data transmitter 64, which in turn transmits the channel data together with the address data of the terminal to the central facility.

As described above, signal lines 37 and 41 detect the use of the computerized game unit 35 and the refrigerator 40 in the room and are connected to the arithmetic and control circuit 63. Thus, whenever they are used, the charges and the address of the terminal are transmitted to the central facility A.

On the other hand, in the central facility A, the central computer 3 determines whether the television program received by the terminal is chargeable. If it is, the central computer 3 calculates the charge for the reception of the program by the amount of time, etc., and the charges of all the terminals are stored in the host computer 7. Similarly, the charges for the use of any of the rented equipment at the terminals are stored in the host computer 7.

The billing data display system, which is a specific feature of the invention, will now be described.

When, on the side of a terminal B, it is necessary to know the charge for the reception of pay television programs, the charge for the use of any rented equipment, and the hotel charges, the billing data request button 69 is depressed.

In response to this, the arithmetic and control circuit 63 transmits a signal representing the depression of the billing data request button together with the address of the terminal to the central facility A through data transmitter 64. In the central facility A, the central computer 3, receiving the signal through modem 4, detects the terminal which has transmitted the billing data request signal, and receives from the host computer 7 the billing data for that terminal.

At the same time, data (or forcible tuning data) for causing terminal B, which has transmitted the billing data request signal, to tune to the transmission channel of modulator 21 is transmitted through the modem 4 to the terminal B. The forcible tuning data is applied through the data receiver 62 to the arithmetic and control circuit 63. Upon reception of the forcible tuning data, the arithmetic and control circuit 63 supplies the data to the channel selection memory 70, so that the first local oscillator of the PLL is locked to a local oscillation frequency to tune the terminal to a first predetermined channel. As a result, the message "Being computed. Please wait." is displayed on the television set 32.

Thereafter, the billing data for the terminal is transferred from the host computer 7 to the central computer 3, and central computer 3 transmits the billing data to one of the five personal computers 8 through 12 which is not currently in operation. The selected personal computer converts the billing data into video data by using its function as a character generator. The video data is transmitted through one of the modulators 13 through 17 which corresponds to the selected personal computer. In this operation, central computer 3 determines which of the personal computers has been used, and transmits forcible tuning data to the terminal to cause the latter to tune to the channel of the corresponding one of the modulators 13 through 17 corresponding to which of the personal computers 8 through 12 was used to convert the billing data.

As a result, a bill such as the one shown in FIG. 3 is displayed on the television set 32 of the terminal B.

It can be predetermined that the billing data is to be displayed on the television set, for instance, for ten (10) seconds. Therefore, in ten seconds, the central computer 3 suspends the transmission of the forcible tuning data, and the channel of the terminal B is switched over to the channel which was previously received.

When the billing data request buttons of a plurality of terminals are operated simultaneously, central computer 3 detects the number of terminals transmitting billing data request signals. When the number of terminals requesting billing data is between six (6) and thirty (30), central computer 3 causes the buffer to store the addresses of these terminals, and requests billing data for these terminals from host computer 7. In this operation, as was described above, the terminals are forcibly tuned to the particular video signal so that the message "Being computed. Please wait." is displayed on the television sets thereof.

The period of time for which billing data is transmitted to each terminal is limited, for instance to ten (10) seconds, as was described above. Therefore, the billing data can be transmitted to the terminals quickly by having personal computers 8 through 12 accomplish operations successively.

When more than thirty (30) terminals transmit billing data request signals at the same time, central computer 3 utilizes the 75 MHz "down" data channel to transmit a busy flag to all of the terminals B. As a result, in each of the terminals B, a busy flag is set in the arithmetic and control circuit 63. In the terminal which has sent the billing data request signal, central computer 3 immediately applies an instruction to the channel selection memory 70 to tune the terminal to a second predetermined channel, namely, the output channel of modulator 22 in the central facility A. As a result, for instance a message "Now very busy. Please call later." is displayed on the television set of the terminal.

As is apparent from the above description, according to the present invention, the charges for the reception of pay television programs and/or the charges for the use of other equipment in each room can be displayed on the television set of the terminal merely by depressing the billing data request button. This is a very convenient service for a hotel guest. Furthermore, depending on the number of terminals operating the charge request button at the same time, the central computer displays the corresponding video messages on the television sets of the terminals. Therefore, although the number of character generators employed is relatively small, the system is rationally operated, offering good service to the hotel guest.

Furthermore, with the present invention, total cost of the billing data display system can be reduced by virtue of the efficient utilization of the personal computers.

What is claimed is:

1. A billing data display system for a closed circuit TV system in which a central facility transmits video signals to a plurality of connected terminals, each of which is operated by a respective customer, said system comprising:
   a computer at said central facility for storing data corresponding to charges owed by said customers;
   means for requesting billing data from said central facility;
   a plurality of first character generators at said central facility which are responsive to a billing data request from said terminals for converting charge data provided by said computer into video data which is transmitted to said terminals; and
   means at each terminal for displaying said billing data,
   wherein said central facility further comprises means for transmitting predetermined messages to said terminals when the number of billing data requests is larger than the number of said first character generators.

2. A billing data display system as claimed in claim 1, wherein said means for transmitting predetermined messages comprises a plurality of second character generators which transmit at least two different video signals to said terminals according to the number of said terminals simultaneously requesting transmission of billing data.

3. A billing data display system as claimed in claim 1, wherein said data stored in said computer includes data corresponding to charges for the reception of pay television programs by said terminals.

4. A billing data display system as claimed in claim 3, wherein said pay television programs are shown on said display means.

5. A billing data display system as claimed in claim 1, wherein said data stored in said computer includes data corresponding to accommodation charges.

6. A billing data display system as claimed in claim 1, wherein said billing data display system is used in a hotel and each of said terminals is located in a respective hotel room.

7. A billing data display system as claimed in claim 1, wherein said means for requesting billing data comprises a request button.

8. A billing data display system as claimed in claim 1, wherein said display means is a television set.

9. A billing data display system for a closed circuit TV system in which a central facility transmits video signals to a plurality of connected terminals, each of which is operated by a respective customer, said system comprising:
   a computer at said central facility for storing data corresponding to charges owed by said customers;
   means for requesting billing data from said central facility;
   a plurality of first character generators at said central facility which are responsive to a billing data request from said terminals for converting charge data provided by said computer into video data which is transmitted to said terminals; and
   means at each terminal for displaying said billing data,
   wherein said data stored in said computer includes data corresponding to charges for equipment other than for viewing pay television programs used by said customers.

10. A terminal used in a billing data display system for a closed circuit TV system, said billing data display system using a central facility to transmit video signals to a plurality of connected terminals, said terminal comprising:

bill requesting means operated by a customer;

means for sending, in response to manipulation of said bill requesting means by said customer, address information of said terminal and a billing data request signal to said central facility;

means, responsive to predetermined message tuning data transmitted to said terminal from said central facility after a billing data request is initiated and prior to the transmission of billing data, for forceably tuning said terminal to a first predetermined channel on which said central facility transmits a predetermined message, all said terminals in said system having the same first predetermined channel;

means responsive to a billing signal tuning signal, for forceably tuning said terminal to a selected channel in which said central facility transmits billing data for the specific terminal; and means for displaying said billing data and said predetermined messages.

* * * * *